United States Patent
Kamiyoshi et al.

(10) Patent No.: US 8,277,875 B2
(45) Date of Patent: Oct. 2, 2012

(54) POLYESTERS FOR THERMAL TRANSFER IMAGE-RECEIVING SHEETS

(75) Inventors: Nobumichi Kamiyoshi, Wakayama (JP); Takashi Mukai, Wakayama (JP); Yuuta Matsumoto, Wakayama (JP); Shinichi Sata, Wakayama (JP); Yoshiaki Ban, Wakayama (JP)

(73) Assignee: Kao Corporation, Tokyo (JP)

( * ) Notice: Subject to any disclaimer, the term of this patent is extended or adjusted under 35 U.S.C. 154(b) by 493 days.

(21) Appl. No.: 12/503,276

(22) Filed: Jul. 15, 2009

(65) Prior Publication Data
US 2010/0028569 A1    Feb. 4, 2010

(30) Foreign Application Priority Data
Aug. 4, 2008  (JP) ................. 2008-200590

(51) Int. Cl.
*B41M 3/12* (2006.01)
*B41M 5/50* (2006.01)
*C08G 61/02* (2006.01)
*C08G 63/00* (2006.01)

(52) U.S. Cl. ............ 427/146; 503/227; 528/86; 528/176
(58) Field of Classification Search .................. None
See application file for complete search history.

(56) References Cited

U.S. PATENT DOCUMENTS

| 7,074,495 B2 * | 7/2006 | Tamagawa et al. ......... 428/537.5 |
| 7,109,146 B2 * | 9/2006 | Tani et al. ..................... 503/227 |
| 2006/0275587 A1 * | 12/2006 | Tamagawa et al. ......... 428/195.1 |

OTHER PUBLICATIONS

U.S. Appl. No. 12/630,579, filed Dec. 3, 2009, Ban, et al.

* cited by examiner

*Primary Examiner* — Bruce H Hess
(74) *Attorney, Agent, or Firm* — Oblon, Spivak, McClelland, Maier & Neustadt, L.L.P.

(57) ABSTRACT

The present invention relates to a polyester for thermal transfer image-receiving sheets which includes a polyester A produced from an alcohol component containing 50 mol % or more of an alkyleneoxide adduct of 2,2-bis(4-hydroxyphenyl)propane and an acid component containing 80 mol % or more of an aliphatic carboxylic acid and/or an alicyclic carboxylic acid as a total amount thereof, and a polyester B produced from an alcohol component containing 80 mol % or more of the alkyleneoxide adduct of 2,2-bis(4-hydroxyphenyl)propane and an acid component containing 10 to 35 mol % of a trivalent or higher valent aromatic polycarboxylic acid; a resin dispersion containing the polyester; a process for producing the resin dispersion; a thermal transfer image-receiving sheet using the polyester; and a process for producing the thermal transfer image-receiving sheet. The thermal transfer image-receiving sheet is capable of satisfying all of a dyeability, a light resistance and a releasability at the same time.

20 Claims, No Drawings

POLYESTERS FOR THERMAL TRANSFER IMAGE-RECEIVING SHEETS

CROSS REFERENCES TO RELATED APPLICATIONS

This application claims priority to Japanese Patent Application No. 2008-200590, filed on Aug. 4, 2008.

FIELD OF THE INVENTION

The present invention relates to a polyester for thermal transfer image-receiving sheets, a resin dispersion containing the polyester, a thermal transfer image-receiving sheet using the polyester, and processes for producing the resin dispersion and the thermal transfer image-receiving sheet.

BACKGROUND OF THE INVENTION

There has been proposed the method for forming color images on a thermal transfer image-receiving sheet which is dyeable with a sublimable dye by using a thermal transfer sheet composed of the sublimable dye as a recording material and a substrate on which the sublimable dye is supported. In this method, the dye is heated using a heating means such as a thermal head of a printer and transferred on the image-receiving sheet to obtain the color images. The thus formed images are very clear and excellent in transparency because of the dye used, and are therefore expected to provide high-quality images which are excellent in reproducibility of half tones and gradation. In recent years, there is a demand for thermal transfer image-receiving sheets which are excellent in various properties, in particular, all of of dyeability with dyes, light resistance and releasability.

In the dye receptor layer of some of the thermal transfer image-receiving sheets, polyesters are used from the viewpoint of an excellent dyeability thereof with dyes. The thermal transfer image-receiving sheets using such polyesters are disclosed, for example, in JP 5-238167A, JP 2006-347148A, JP 2004-255880A, JP 2004-256813A and JP 2007-175916A in which the embodiments respectively paying attention to specific alcohol components, etc., are described.

SUMMARY OF THE INVENTION

Thus, the present invention relates to:
[1] A polyester for thermal transfer image-receiving sheets, including a polyester A produced from an alcohol component containing 50 mol % or more of an alkyleneoxide adduct of 2,2-bis(4-hydroxyphenyl)propane represented by the formula (I):

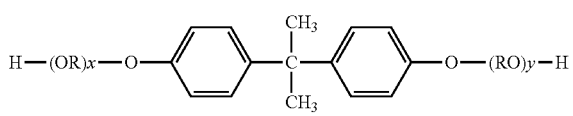

(I)

wherein RO is an oxyalkylene group; R is an ethylene group or a propylene group; and x and y each represent a molar number of addition of alkylene oxides, and are respectively a positive number with the proviso that a sum of x and y is from 2 to 7 on the average,
and an acid component containing 80 mol % or more of an aliphatic carboxylic acid and/or an alicyclic carboxylic acid as a total amount thereof, and a polyester B produced from an alcohol component containing 80 mol % or more of the alkyleneoxide adduct of 2,2-bis(4-hydroxyphenyl)propane represented by the above formula (I), and an acid component containing 10 to 35 mol % of a trivalent or higher valent aromatic polycarboxylic acid;

[2] A resin dispersion for thermal transfer image-receiving sheets, including an aqueous medium, and a resin containing the polyester for thermal transfer image-receiving sheets as defined in the above [1] which is dispersed in the aqueous medium.

[3] A process for producing a resin dispersion for thermal transfer image-receiving sheets, including the step of dispersing resin particles including the polyester for thermal transfer image-receiving sheets as defined in the above [1], in an aqueous medium;

[4] A process for producing a thermal transfer image-receiving sheet, including the steps of (1) producing a resin dispersion by the process as defined in the above [3]; and (2) applying the resin dispersion obtained in the step (1) onto at least one surface of a substrate to form a dye receptor layer thereon; and

[5] A thermal transfer image-receiving sheet including a substrate and a dye receptor layer formed on at least one surface of the substrate by applying the resin dispersion as defined in the above [2] onto the surface of the substrate.

DETAILED DESCRIPTION OF THE INVENTION

However, the techniques described in the above patent documents have failed to provide a thermal transfer image-receiving sheet capable of satisfying all of a dyeability, a light resistance and a releasability at the same time. More specifically, in the polyesters used in a dye receptor layer of the thermal transfer image-receiving sheet, a constitutional unit derived from bisphenol A as an aromatic alcohol which has a high dyeability with dyes is likely to be decomposed upon exposure to light, and a constitutional unit derived from an aromatic carboxylic acid is more likely to undergo structural decomposition. On the other hand, a constitutional unit derived from an alicyclic alcohol or an aliphatic alcohol which hardly undergoes structural decomposition tends to be unsatisfactory in dyeability, whereas a constitutional unit derived from a aliphatic carboxylic acid and/or an alicyclic carboxylic acid which hardly undergoes structural decomposition and exhibits an excellent light resistance tends to be deteriorated in releasability. Thus, any conventional combination of the raw material components has still failed to provide a polyester for thermal transfer image-receiving sheets which is capable of satisfying all of a dyeability, a light resistance and a releasability.

The present invention relates to a polyester for thermal transfer image-receiving sheets which allows the resulting thermal transfer image-receiving sheet to satisfy all of a dyeability, a light resistance and a releasability at the same time; a resin dispersion containing the polyester; a process for producing the resin dispersion; a thermal transfer image-receiving sheet using the polyester; and a process for producing the thermal transfer image-receiving sheet.

[Polyester for Thermal Transfer Image-Receiving Sheets]

The polyester for thermal transfer image-receiving sheets according to the present invention includes a polyester A obtained from an alcohol component containing 50 mol % or more of the alkyleneoxide adduct of 2,2-bis(4-hydroxyphenyl)propane represented by the above formula (1) and an acid component containing 80 mol % or more of an aliphatic carboxylic acid and/or an alicyclic carboxylic acid as a total amount thereof, and a polyester B obtained from an alcohol component containing 80 mol % or more of the alkyleneoxide adduct of 2,2-bis(4-hydroxyphenyl)propane represented by the above formula (1) and an acid component containing 10 to 35 mol % of a trivalent or higher valent aromatic polycarboxylic acid.

Thus, in the present invention, the polyester obtained from a raw monomer component containing bisphenol A having a high dyeability and an aliphatic carboxylic acid and/or an alicyclic carboxylic acid having a high light resistance is not used singly, but the polyester obtained from bisphenol A and an aliphatic carboxylic acid and/or an alicyclic carboxylic acid as raw monomers is used in combination with the polyester obtained from bisphenol A and a trivalent or higher valent polycarboxylic acid. Namely, the polyester produced from the monomers each selected in view of only individual specific properties is incapable of satisfying a good balance between various properties as required. On the other hand, in the case of combination of the polyesters, functions for achieving the required properties can be separately shared by the respective polyesters when using a specific amount of an aliphatic carboxylic acid and/or an alicyclic carboxylic acid in one polyester and using a specific amount of a trivalent or higher valent aromatic polycarboxylic acid in the other polyester. As a result, the resulting thermal transfer image-receiving sheet is capable of satisfying all of a dyeability, a light resistance and a releasability at the same time owing to an interaction between both the polyesters.

Polyester A

The polyester A used in the present invention is obtained from an alcohol component containing 50 mol % or more of the alkyleneoxide adduct of 2,2-bis(4-hydroxyphenyl)propane represented by the above formula (I) and an acid component containing 80 mol % or more of an aliphatic carboxylic acid and/or an alicyclic carboxylic acid as a total amount thereof.

As a raw monomer of the polyester A, there is used the alcohol component containing 50 mol % or more of the alkyleneoxide adduct of 2,2-bis(4-hydroxyphenyl)propane represented by the above formula (I). In the above formula (I), R is an ethylene group or a propylene group; and x and y each represent a molar number of addition of alkylene oxides, and are respectively a positive number. The respective R groups may be the same or different from each other. A sum of x and y is from 2 to 7, preferably from 2 to 5 and more preferably not less than 2 but less than 4 on the average from the viewpoint of a good reactivity with the carboxylic acid component.

Specific examples of the alkyleneoxide adduct of 2,2-bis (4-hydroxyphenyl)propane represented by the above formula (I) include polyoxypropylene-2,2-bis(4-hydroxyphenyl)propane and polyoxyethylene-2,2-bis(4-hydroxyphenyl)propane which have the molar number of addition of alkyleneoxides within the above-specified range.

The weight ratio of an ethyleneoxide adduct to a propyleneoxide adduct (ethyleneoxide adduct/propyleneoxide adduct) in the alkyleneoxide adduct of 2,2-bis(4-hydroxyphenyl)propane represented by the above formula (I) is preferably from 50/50 to 0/100 in terms of a molar ratio therebetween. When the weight ratio of the ethyleneoxide adduct to the propyleneoxide adduct in the alkyleneoxide adduct lies within the above-specified range, the resulting thermal transfer image-receiving sheet is excellent in releasability. From the same viewpoint as described above, the content ratio of the ethyleneoxide adduct to the propyleneoxide adduct in the alkyleneoxide adduct is more preferably from 40/60 to 0/100, even more preferably from 30/70 to 0/100 and further even more preferably 0/100.

The content of the alkyleneoxide adduct of 2,2-bis(4-hydroxyphenyl)propane represented by the above formula (I) in the raw alcohol component is 50 mo % or more, preferably 70 mol % or more, more preferably 80 mol % or more and further even more preferably substantially 100 mol % from the viewpoints of a good releasability of the resulting thermal transfer image-receiving sheet and a good dyeability thereof with dyes.

A part of the ethyleneoxide adduct and/or propyleneoxide adduct may be replaced with the other alkyleneoxide adduct unless the effects of the present invention are adversely affected.

In the present invention, the alcohol component used as a raw material of the polyester A may also contain, in addition to the alkyleneoxide adduct of bisphenol A, other known alcohol components. Examples of the other alcohol components include ethylene glycol, propylene glycol(1,2-propanediol), glycerol, pentaerythritol, trimethylol propane, hydrogenated bisphenol A, sorbitol, and alkylene ($C_2$ to $C_4$) oxide adducts (average molar number of addition: 1 to 16) of these compounds. From the viewpoint of a good releasability of the resulting thermal transfer image-receiving sheet, the above other alcohol component is preferably selected from trivalent or higher valent alcohols. Specific examples of the preferred trivalent or higher valent alcohols include glycerol and pentaerythritol. These other alcohol components may be used singly or in combination of any two or more thereof.

The carboxylic acid component as the raw monomer of the polyester A contains an aliphatic carboxylic acid and/or an alicyclic carboxylic acid in a total amount of 80 mol % or more.

Examples of the aliphatic carboxylic acid include dicarboxylic acids such as fumaric acid, maleic acid, adipic acid and succinic acid, carboxylic acids such as stearic acid, and anhydrides and alkyl ($C_1$ to $C_3$) esters of these acids. These aliphatic carboxylic acids may be used singly or in combination of any two or more thereof.

In the present invention, from the viewpoint of a good dyeability of the thermal transfer image-receiving sheet, among these aliphatic carboxylic acids, preferred are succinic acids containing an alkyl group and/or an alkenyl group; more preferred are the substituted succinic acids containing an alkyl group having 1 to 22 carbon atoms or an alkenyl group having 2 to 22 carbon atoms such as dodecenyl succinic acid and octenyl succinic acid; and even more preferred are the substituted succinic acids containing a linear, branched or cyclic alkyl group having 8 to 22 carbon atoms and preferably 10 to 20 carbon atoms or a linear, branched or cyclic alkenyl group having 8 to 22 carbon atoms and preferably 10 to 20 carbon atoms.

Specific examples of the alkyl group contained in the substituted succinic acid containing an alkyl group and/or an alkenyl group include various octyl groups, various decyl groups, various dodecyl groups, various tetradecyl groups, various hexadecyl groups, various octadecyl groups and various icosyl groups.

Specific examples of the alkenyl group contained in the substituted succinic acid containing an alkyl group and/or an alkenyl group include various octenyl groups, various decenyl groups, various dodecenyl groups, various tetradecenyl groups, various hexadecenyl groups, various octadecenyl groups and various icosenyl groups.

The content of the succinic acid containing an alkyl group and/or an alkenyl group in the carboxylic acid component is preferably from 5 to 50 mol % in order to enhance the dyeability of the thermal transfer image-receiving sheet. The reason therefor is considered as follows. That is, the alkyl group and/or the alkenyl group present in a side chain of the succinic acid serves for reducing an interaction between molecules of the polyester, so that dyes can penetrate up to an inside of the polyester. From the viewpoint of a good penetrability of the dyes into the polyester, i.e., a good dyeability of the thermal transfer image-receiving sheet, the content of the succinic acid containing an alkyl group and/or an alkenyl group in the carboxylic acid component is more preferably from 10 to 40 mol % and even more preferably from 20 to 40 mol %.

As the alicyclic carboxylic acid, there are preferably used alicyclic dicarboxylic acids and anhydrides or alkyl esters of these acids. From the viewpoint of a good reactivity with alcohols upon synthesis of the polyester as well as a good heat resistance of the polyester, among these alicyclic carboxylic acids, more preferred are cyclohexanedicarboxylic acids, decalindicarboxylic acids and anhydrides of these acids.

Specific examples of the alicyclic carboxylic acid include 1,4-cyclohexanedicarboxylic acid, 2-methyl-1,4-cyclohexanedicarboxylic acid, 2-ethyl-1,4-cyclohexanedicarboxylic acid, 2-propyl-1,4-cyclohexanedicarboxylic acid, 2-butyl-1,4-cyclohexanedicarboxylic acid, 2-tert-butyl-1,4-cyclohexanedicarboxylic acid, 2,3-dimethyl-1,4-cyclohexanedicarboxylic acid, 2,3-diethyl-1,4-cyclohexanedicarboxylic acid, 2,3-dipropyl-1,4-cyclohexanedicarboxylic acid, 2,3-dibutyl-1,4-cyclohexanedicarboxylic acid, 2-methyl-3-ethyl-1,4-cyclohexanedicarboxylic acid, 2-methyl-3-propyl-1,4-cyclohexanedicarboxylic acid, 2-methyl-3-butyl-1,4-cyclohexanedicarboxylic acid, 2-ethyl-3-propyl-1,4-cyclohexanedicarboxylic acid, 2-ethyl-3-butyl-1,4-cyclohexanedicarboxylic acid, 2-methyl-3-t-butyl-1,4-cyclohexanedicarboxylic acid, 1,2-cyclohexanedicarboxylic acid, 2,6-decalindicarboxylic acid, 3-methyl-2,6-decalindicarboxylic acid, 3-ethyl-2,6-decalindicarboxylic acid, 3-propyl-2,6-decalindicarboxylic acid, 3-butyl-2,6-decalindicarboxylic acid, 3,4-dimethyl-2,6-decabindicarboxylic acid, 3,4-diethyl-2,6-decalindicarboxylic acid, 3,4-dipropyl-2,6-decalindicarboxylic acid, 3,4-dibutyl-2,6-decalindicarboxylic acid, 3,8-dimethyl-2,6-decalindicarboxylic acid, 3,8-diethyl-2,6-decahindicarboxylic acid, 3,8-dipropyl-2,6-decaiindicarboxylic acid, 3,8-dibutyl-2,6-decalindicarboxylic acid, 3-methyl-4-ethyl-2,6-decalindicarboxylic acid, 3-methyl-4-propyl-2,6-decahindicarboxylic acid, 3-methyl-4-butyl-2,6-decalindicarboxylic acid, 3-ethyl-4-butyl-2,6-decalindicarboxylic acid, and anhydrides of these acids. Among these alicyclic carboxylic acids, preferred are 1,2-cyclohexanedicarboxylic acid and hexahydrophthalic anhydride as an anhydride of 1,2-cyclohexanedicarboxylic acid, and 1,4-cyclohexanedicarboxylic acid, and from the viewpoint of a good releasability of the resulting thermal transfer image-receiving sheet, more preferred is 1,4-cyclohexanedicarboxylic acid.

In the present invention, from the viewpoints of a good releasability and a good moisture resistance of the resulting thermal transfer image-receiving sheet, the alicyclic carboxylic acid is preferably used as the raw acid component of the polyester A.

From the viewpoints of a good light resistance, etc., of the resulting thermal transfer image-receiving sheet, the aliphatic carboxylic acid and/or the alicyclic carboxylic acid are contained in the raw carboxylic acid component in a total amount of 80 mol % or more. The content of the divalent carboxylic acids including the aliphatic carboxylic acid and/or the alicyclic carboxylic acid in the carboxylic acid component is preferably 90 mol % or more, more preferably 95 mol % or more and even more preferably substantially 100 mol %. That is, the aliphatic carboxylic acid and/or the alicyclic carboxylic acid are contained in the carboxylic acid component in an amount of preferably 90 mol % or more, more preferably 95 mol % or more and even more preferably substantially 100 mol %.

In the present invention, the carboxylic acid component as the raw material of the polyester A may also contain, in addition to the above aliphatic carboxylic acid and/or the alicyclic carboxylic acid, other known carboxylic acids. Specific examples of the other known carboxylic acids include divalent carboxylic acids such as dicarboxylic acids, e.g., phthalic acid, isophthalic acid and terephthalic acid; trivalent or higher valent polycarboxylic acids such as trimellitic acid and pyromellitic acid; and anhydrides and alkyl ($C_1$ to $C_3$) esters of these acids. These carboxylic acids may be used singly or in combination of any two or more thereof.

In the present invention, from the viewpoint of a good releasability of the resulting thermal transfer image-receiving sheet, it is effective to use a trivalent or higher valent carboxylic acid and/or an anhydride thereof as the carboxylic acid component other than the aliphatic carboxylic acid and/or the alicyclic carboxylic acid. More specifically, trimellitic acid, pyromellitic acid and/or anhydrides of these acids are preferably used, and trimellitic acid and/or trimellitic anhydride are more preferably used.

The content of the trivalent or higher valent carboxylic acid, if used, in the carboxylic acid component, is preferably less than 10 mol % and more preferably less than 5 mol %.

The polyester A may be produced, for example, by polycondensing the alcohol component and the carboxylic acid component in an inert gas atmosphere at a temperature of 180 to 250° C., if required, in the presence of an esterification catalyst. From the viewpoint of a good dyeability as well as a good releasability of the resulting thermal transfer image-receiving sheet, the raw polyester preferably has a broad molecular weight distribution, and further is preferably subjected to polycondensation using an esterification catalyst. Examples of the esterification catalyst include tin catalysts, titanium catalysts, and metal compounds such as antimony trioxide, zinc acetate and germanium dioxide.

From the viewpoints of a good dyeability as well as a good releasability of the resulting thermal transfer image-receiving sheet, the polyester A used in the present invention preferably has a softening point of preferably from 75 to 130° C., more preferably from 80 to 125° C. and even more preferably from 95 to 120° C., and a glass transition point of preferably from 35 to 65° C. Also, the polyester A preferably has an acid value of from 1 to 35 mg KOH/g and more preferably from 5 to 25 mg KOH/g from the viewpoints of a good dispersibility, i.e., a good emulsifiability of the polyester A in the aqueous medium. Meanwhile, the polyester A having desired glass transition point, softening point and acid value can be obtained by adequately controlling kinds and blending ratios of the monomers used as well as reaction temperature and time used in the polycondensation.

In addition, from the viewpoint of a good film-forming property upon production of the thermal transfer image-receiving sheet, the number-average molecular weight of the polyester A is preferably from 1,000 to 10,000, more preferably from 2,000 to 8,000 and even more preferably from 2,000 to 7,000.

Polyester B

The polyester B used in the present invention is obtained from an alcohol component containing 80 mol % or more of the alkyleneoxide adduct of 2,2-bis(4-hydroxyphenyl)propane represented by the above formula (I) and an acid component containing 10 to 35 mol % of a trivalent or higher valent aromatic polycarboxylic acid.

The alcohol component used as the raw monomer for forming the polyester B may be the same alkyleneoxide adduct of 2,2-bis(4-hydroxyphenyl)propane represented by the above formula (I) as used for production of the polyester A from the viewpoints of a good releasability of the resulting thermal transfer image-receiving sheet and a good dyeability thereof with dyes.

The content of the alkyleneoxide adduct of 2,2-bis(4-hydroxyphenyl)propane represented by the above formula (I) in the raw alcohol component is 80 mo % or more, preferably 90 mol % or more and more preferably 100 mol % from the viewpoints of a good releasability of the resulting thermal transfer image-receiving sheet and a good dyeability thereof with dyes.

The alcohol component used as the raw material of the polyester B in the present invention may also contain, in addition to the alkyleneoxide adduct of bisphenol A, other known alcohol components. Specific examples of the other alcohol components include the same known alcohol components as used together with the alkyleneoxide adduct of bisphenol A upon production of the polyester A.

In the present invention, from the viewpoint of a good releasability of the resulting thermal transfer image-receiving sheet, the above other alcohol component is preferably selected from trivalent or higher valent alcohols. Specific examples of the preferred trivalent or higher valent alcohols include glycerol and pentaerythritol.

The acid component used as the raw material of the polyester B contains a trivalent or higher valent aromatic polycarboxylic acid. In the present invention, the trivalent or higher valent aromatic polycarboxylic acid is also intended to involve anhydrides and alkyl ($C_1$ to $C_3$) esters thereof. From the viewpoint of a good releasability of the resulting thermal transfer image-receiving sheet, as the trivalent or higher valent aromatic polycarboxylic acid, trimellitic acid, pyromellitic acid and anhydrides of these acids are preferably used, and trimellitic acid and/or trimellitic anhydride are more preferably used.

The trivalent or higher valent aromatic polycarboxylic acid is contained in the raw acid component in an amount of from 10 to 35 mol %. From the viewpoint of a good releasability of the resulting thermal transfer image-receiving sheet, the content of the trivalent or higher valent aromatic polycarboxylic acid in the acid component is preferably from 10 to 30 mol % and more preferably from 10 to 20 mol %.

In the present invention, the acid component used as the raw material of the polyester B may also contain, in addition to the above trivalent or higher valent aromatic polycarboxylic acid, the other known acid components. Specific examples of the other known acid components include dicarboxylic acids such as phthalic acid, isophthalic acid, terephthalic acid, fumaric acid, maleic acid, adipic acid and succinic acid; the substituted succinic acids containing an alkyl group having 1 to 22 carbon atoms or an alkenyl group having 2 to 22 carbon atoms as described in the above polyester A; and anhydrides of these acids and alkyl ($C_1$ to $C_3$) esters thereof. The carboxylic acid component preferably contains an aromatic dicarboxylic acid and an anhydride of these acids and alkyl ($C_1$ to $C_3$) ester thereof from the viewpoint of a good releasability of the resulting thermal transfer image-receiving sheet and a good dyeability thereof with dyes. Specific examples of the aromatic dicarboxylic acid and the anhydride of these acids and alkyl ($C_1$ to $C_3$) ester thereof include phthalic acid, isophthalic acid, terephthalic acid and anhydrides of these acids and alkyl ($C_1$ to $C_3$) esters thereof These carboxylic acid components may be used singly or in combination of any two or more thereof. The content of the aromatic dicarboxylic acid and the anhydride of these acids and alkyl ($C_1$ to $C_3$) ester thereof in the divalent carboxylic acids contained in the carboxylic acid component is preferably 80 mol % or more, more preferably 90 mol % or more and even more preferably substantially 100 mol %.

The polyester B may also be produced in the same manner as the polyester A.

From the viewpoints of a good dyeability as well as a good releasability of the resulting thermal transfer image-receiving sheet, the polyester B used in the present invention has a softening point of preferably from 120 to 160° C. and more preferably from 130 to 155° C., and a glass transition point of preferably from 60 to 80° C. Also, the polyester B preferably has an acid value of from 10 to 40 mg KOH/g and more preferably from 10 to 35 mg KOH/g from the viewpoints of a good dispersibility, i.e., a good emulsifiability of the polyester B in the aqueous medium. Meanwhile, the polyester B having desired glass transition point, softening point and acid value can be obtained by adequately controlling kinds and blending ratios of the monomers used as well as reaction temperature and time used in the polycondensation.

In addition, from the viewpoint of a good film-forming property upon production of the thermal transfer image-receiving sheet, the number-average molecular weight of the polyester B is preferably from 1,000 to 10,000, more preferably from 2,000 to 8,000 and even more preferably from 2,000 to 7,000.

Polyester for Thermal Transfer Image-Receiving Sheets

The polyester for thermal transfer image-receiving sheets according to the present invention (hereinafter occasionally referred to merely a "polyester of the present invention") preferably contains the polyester A and the polyester B at a weight ratio of the polyester A to the polyester B (polyester A/polyester B) of from 2/80 to 80/20 from the viewpoints of a good releasability and a good light resistance of the resulting thermal transfer image-receiving sheet. From the same viewpoint as described above, the weight ratio of the polyester A to the polyester B in the polyester of the present invention is more preferably from 40/60 to 80/20 and even more preferably from 50/50 to 80/20. It is preferred that the polyester of the present invention be formed of the polyester A and the polyester B only.

In addition, in order to allow the resulting thermal transfer image-receiving sheet to satisfy all of a good dyeability, a good light resistance and a good releasability, a difference between softening points of the polyester A and the polyester B is preferably 10° C. or more, more preferably 20° C. or more, and even more preferably 30° C. or more. The upper limit of the difference between softening points of the polyester A and the polyester B is preferably 100° C. and more preferably 90° C.

Meanwhile, the softening point, glass transition point, acid value and number-average molecular weight of the polyester of the present invention mean the softening point, glass transition point, acid value and number-average molecular weight of a mixture of the resins constituting the polyester.

From the viewpoints of a good dyeability and a good releasability of the resulting thermal transfer image-receiving sheet, the softening point of the polyester of the present invention is preferably from 75 to 160° C. and more preferably from 80 to 155° C.; and the glass transition point thereof is preferably from 35 to 80° C. and more preferably from 50 to 80° C. From the viewpoints of a good dispersibility, i.e., a good emulsifiability of the polyester-containing resin in the aqueous medium, the acid value of the polyester of the present invention is preferably from 1 to 40 mg KOH/g and more preferably from 5 to 36 mg KOH/g. The polyester having desired glass transition point, softening point and acid value can be obtained by adequately controlling kinds and blending ratios of the monomers used as well as reaction temperature and time used in the polycondensation.

From the viewpoint of a good film-forming property upon producing the thermal transfer image-receiving sheet, the number-average molecular weight of the polyester of the present invention is preferably from 1,000 to 10,000, more preferably from 2,000 to 8,000 and even more preferably from 2,000 to 7,000.

Meanwhile, in the present invention, as the polyester A and the polyester B, there may also be used modified polyesters which are obtained by modifying the polyester to such an extent that the properties of the polyester are still kept within the above-specified ranges substantially without deterioration thereof. Examples of the modified polyesters include polyesters which are grafted or blocked with phenol, urethane, epoxy, etc., by the methods described in JP 11-133668A, JP 10-239903A, JP 8-20636A, etc., and composite resins having two or more kinds of resin units including polyester units.

The polyester of the present invention containing the polyester A and the polyester B may be of any configuration such as a configuration in which the polyester A and the polyester B are at least partially mixed with each other, and a configuration in which the polyester A and the polyester B are present separately from each other.

[Resin Dispersion for Thermal Transfer Image-Receiving Sheets]

The resin dispersion for thermal transfer image-receiving sheets 30 according to the present invention (hereinafter occasionally referred to merely as a "resin dispersion of the present invention") includes an aqueous medium, and resin particles containing the polyester for thermal transfer image-receiving sheets as described in the above [1] which is dispersed in the aqueous medium.

Resin Dispersion of the Present Invention

The resins used in the resin dispersion of the present invention may also contain other resins in addition to the above-described polyester. As the other resins, there may be used known resins conventionally employed for forming a receptor layer of thermal transfer image-receiving sheets. Examples of the other resins include polyolefin-based resins such as polypropylene; halogenated polymers such as polyvinyl chloride and polyvinylidene chloride; vinyl polymers such as polyvinyl acetate, polyacrylic esters and polyvinyl acetal; polystyrene-based resins; polyamide-based resins; copolymer-based resins of olefins such as ethylene and propylene with other vinyl monomers; ionomers; cellulose-based resins such as cellulose diacetate; and polycarbonates. Among these resins, preferred are polyvinyl chloride and polycarbonates from the viewpoints of a good dyeability and a good releasability of the resulting thermal transfer image-receiving sheet.

From the viewpoint of a good dyeability of the resulting thermal transfer image-receiving sheet with dyes, the resins constituting the resin dispersion of the present invention preferably contain the polyester of the present invention in an amount of 70% by weight or more, more preferably 80% by weight or more and even more preferably 100% by weight.

Therefore, the resins containing the polyester of the present invention preferably have the same softening point, glass transition point, acid value and number-average molecular weight as those of the polyester of the present invention.

In the resin dispersion of the present invention, from the viewpoint of a good environmental suitability, the polyester is preferably present in the form of resin particles obtained by dispersing the resins containing the polyester in an aqueous medium.

The aqueous medium used for dispersing the polyester therein contains water as a main component, i.e., in an amount of 50% or more. From the viewpoint of a good environmental suitability, the water content in the aqueous medium is preferably 80% by weight or more, more preferably 90% by weight or more and even more preferably substantially 100% by weight. Examples of components other than water which may be contained in the aqueous medium include water-soluble organic solvents such as methanol, ethanol, isopropanol, butanol, acetone, methyl ethyl ketone and tetrahydrofuran.

The volume-median particle size (D50) of the polyester-containing resin particles in the resin dispersion is preferably 1 μm or less, more preferably from 20 nm to 1 μm and even more preferably from 50 to 800 nm from the viewpoint of a good film-forming property upon producing the thermal transfer image-receiving sheet. Meanwhile, the "volume-median particle size (D50)" as used herein means a particle size at which a cumulative volume frequency calculated on the basis of a volume fraction of particles from a smaller particle size side thereof is 50%, and may be measured by the below-mentioned method.

From the viewpoint of a good dyeability of the thermal transfer image-receiving sheet with dyes, the content of the polyester or the polyester-containing resins in a solid component of the resin dispersion is preferably from 80 to 100% by weight, more preferably from 85 to 100% by weight and even more preferably from 90 to 100% by weight.

The resin dispersion may be produced by the method of dissolving the polyester of the present invention or the polyester-containing resins in an organic solvent such as, e.g., a ketone-based solvent, adding a neutralizing agent to the resultant solution to ionize a carboxyl group contained in the polyester or the polyester-containing resins, and then adding water to the thus neutralized solution, followed by distilling off the organic solvent therefrom to convert the resultant reaction solution to an aqueous phase.

When dissolving the polyester of the present invention in the organic solvent, the polyester may be added to the organic solvent either after or while mixing the polyester A and the polyester B with each other, or the polyester A and the polyester B may be independently added to the organic solvent.

More specifically, for example, using a reactor equipped with a stirrer, a reflux condenser, a thermometer, a dropping funnel and a nitrogen gas inlet tube, the solution prepared by dissolving the polyester or the polyester-containing resins in the organic solvent is mixed with a neutralizing agent, etc., to ionize a carboxyl group contained therein (not required when the carboxyl group is already ionized), and then water is added to the obtained reaction solution, followed by distilling off the organic solvent therefrom to convert the reaction solution to an aqueous phase. The dissolution in the organic solvent and addition of the neutralizing agent may be usually conducted at a temperature not higher than a boiling point of the organic solvent such as ketone-based solvents. Also, examples of the water used in the above method include deionized water.

Among the organic solvents, the ketone-based solvents are preferred from the viewpoint of a good dispersibility of the resin particles in the resulting resin dispersion.

Examples of the ketone-based solvents usable in the present invention include acetone, methyl ethyl ketone, diethyl ketone, dipropyl ketone, methyl isobutyl ketone and methyl isopropyl ketone. Among these ketone-based solvents, methyl ethyl ketone is preferred from the viewpoints of a good solubility of the resin therein and facilitated removal of the solvent by distillation.

Examples of the neutralizing agent for neutralizing the polyester or the polyester-containing resins dissolved in the organic solvent include an aqueous ammonia solution, an aqueous solution of alkali such as sodium hydroxide, and amines such as allyl amine, isopropyl amine, diisopropyl amine, ethyl amine, diethyl amine, triethyl amine, 2-ethylhexyl amine, 3-ethoxypropyl amine, diisobutyl amine, 3-diethylaminopropyl amine, tri-n-octyl amine, t-butyl amine, sec-butyl amine, propyl amine, methylaminopropyl amine, dimethylaminopropyl amine, n-propanol amine, butanol amine, 2-amino-4-pentanol, 2-amino-3-hexanol, 5-amino-4-octanol, 3-amino-3-methyl-2-butanol, monoethanol amine, N,N-dimethyl ethanol amine, isopropanol amine, neopentanol amine, diglycol amine, ethylene diamine, 1,3-diaminopropane, 1,2-diaminopropane, 1,6-diaminohexane, 1,9-diaminononane, 1,12-diaminodecane, dimerized aliphatic acid diamine, 2,2,4-trimethylhexamethylene diamine, 2,4,4-trimethylhexamethylene diamine, hexamethylene diamine, N-aminoethyl piperazine, N-aminopropyl piperazine, N-aminopropyl dipiperidinopropane and piperazine. The neutralizing agent may be used in such an amount capable of neutralizing at least an acid value of the polyester or the polyester-containing resins.

The solid component in the resin dispersion has a glass transition point of preferably from 35 to 80° C. and more preferably from 50 to 75° C., and a softening point of preferably from 70 to 250° C. and more preferably from 75 to 220° C. from the viewpoints of a good storage stability of the resin dispersion as well as a good storage stability and a good releasability of the thermal transfer image-receiving sheet obtained by using the resin dispersion of the present invention. The number-average molecular weight of the solid component in the resin dispersion is substantially the same as that of the above polyester.

The concentration of the solid component in the resin dispersion is preferably from 20 to 50% by weight, more preferably from 25 to 45% by weight and even more preferably from 30 to 40% by weight from the viewpoint of a good productivity of the resin dispersion. In addition, the pH of the above resin dispersion as measured at 25° C. is preferably from 5 to 10, more preferably from 6 to 9.5 and even more preferably from 7 to 9.5 from the viewpoint of a good storage stability of the resin dispersion.

The resin dispersion of the present invention is in the form of a dispersion of the resins containing the polyester of the present invention. The resin dispersion preferably contain resin particles composed of both the polyester A and the polyester B. However, the resin dispersion may contain resin particles composed of the polyester A solely and resin particles composed of the polyester B solely.

Process for Producing Resin dispersion of the Present Invention

The process for producing the resin dispersion for thermal transfer image-receiving sheets according to the present invention includes the step of dispersing the resins containing the polyester for thermal transfer image-receiving sheets in an aqueous medium. The aqueous medium and the polyester for thermal transfer image-receiving sheets which are used in the above process are the same as described above.

The method for dispersing the resins containing the polyester for thermal transfer image-receiving sheets in the aqueous medium is not particularly limited, and includes, for example, a forced emulsification method and a phase inversion emulsification method.

The process for producing the resin dispersion according to the present invention preferably further includes the step of adding an oxazoline group-containing compound thereto. From the viewpoint of a good reactivity between the oxazoline group-containing compound and the resins forming the resin particles, the oxazoline group-containing compound is preferably added to the resin dispersion after completion of production thereof.

As the oxazoline group-containing compound used in the present invention (hereinafter occasionally referred to merely as an "oxazoline compound"), there may be used those compounds containing a plurality of oxazoline groups in a molecule thereof. Examples of the compounds containing a plurality of oxazoline groups in a molecule thereof include difunctional-type compounds such as 2,2-(1,3-phenylene)-bis(2-oxazoline) and 2,2-(1,4-phenylene)-bis(2-oxazoline); and polyfunctional-type compounds (polymers) obtained by polymerizing a polymerizable monomer containing an oxazoline group.

Among these oxazoline compounds, from the viewpoint of effectively exhibiting a crosslinking effect upon the crosslinking reaction with the polyester-containing resin, preferred are the oxazoline group-containing polymers. When using the oxazoline group-containing polymers, it is considered that the crosslinking reaction with the polyester-containing resin is promoted, so that the molecular weight of the resin forming the dye receptor layer composition is increased, thereby improving a releasability between the image-receiving sheet and the thermal transfer sheet. The oxazoline group-containing polymers may be produced, for example, by polymerizing an oxazoline group-containing polymerizable monomer, and further optionally by copolymerizing the oxazoline group-containing polymerizable monomer with a polymerizable monomer containing no oxazoline group which is copolymerizable therewith.

The oxazoline group-containing polymers preferably have a weight-average molecular weight of from 500 to 2,000,000 and more preferably from 1,000 to 1,000,000 from the viewpoints of a good crosslinking reactivity with the resin particles and a good productivity.

Meanwhile, examples of ordinary commercial products of the oxazoline group-containing polymers include "EPOCROSS WS SEIES" (water-soluble type) and "EPOCROSS K SEIES" (emulsion type) both available from Nippon Shokubai Co., Ltd.

The content of the oxazoline compound in the resin dispersion of the present invention or the amount of the oxazoline compound added is preferably from 0.1 to 30 parts by weight and more preferably from 1 to 20 parts by weight in terms of a solid content on the basis of 100 parts by weight of the resins containing the polyester of the present invention from the viewpoints of a good crosslinking reactivity with the resins containing the polyester of the present invention and a good productivity of the resin dispersion of the present invention.

In the process for producing the resin dispersion according to the present invention, the dispersion of the resins containing the polyester of the present invention and the oxazoline compound are mixed with each other at the above mixing ratio and subjected to crosslinking reaction, thereby enhancing a releasability between the transfer sheet and the image-receiving sheet upon thermal transfer of dyes from the transfer sheet. In particular, the resins containing the polyester of the present invention and the oxazoline compound are preferably mixed with each other in an aqueous medium and then subjected to crosslinking reaction. The temperature used in the crosslinking reaction is preferably from 60 to 100° C. and more preferably from 70 to 98° C. When the polyester-containing resin and the oxazoline compound are heated and mixed together in the above-specified temperature range, at least a part of the polyester can be crosslinked with the oxazoline compound to an adequate extent. That is, in the present invention, by adding an adequate amount of the oxazoline compound to the resin dispersion and mixing the oxazoline compound and the resin dispersion in the above-specified temperature range, at least a part of the resin particles dispersed in the resin dispersion are crosslinked and the molecular weight of the resin is increased. As a result, it is considered that the obtained composition is enhanced in releasability and further prevented from being deteriorated in film-forming property owing to the presence of the non-crosslinked polyester inside of the resin particles, thereby maintaining formation of good images even when the molecular weight of the resin is increased.

The solid component of the polyester/crosslinking agent dispersion in which the resins containing the polyester of the present invention and the oxazoline compound are dispersed in the aqueous medium (hereinafter occasionally referred to merely as a "dispersion of resin particles") has a glass transition point of preferably from 40 to 80° C. and more preferably from 50 to 75° C. from the viewpoints of a good storage stability of the dispersion as well as a good storage stability of the resulting thermal transfer image-receiving sheet and a good dyeability with dyes, and also has a softening point of preferably from 80 to 250° C., more preferably from 120 to 240° C., even more preferably from 120 to 230° C. and further even more preferably from 120 to 220° C. from the viewpoints of a good dyeability with dyes as well as a good releasability and a good light resistance of the resulting thermal transfer image-receiving sheet.

The solid concentration and the pH of the above dispersion of resin particles are the same as those described above for the resin dispersion of the present invention.

In the present invention, the crosslinking of the resins containing the polyester of the present invention with the oxazoline compound may be conducted either upon production of the resin dispersion of the present invention or upon applying the resin dispersion onto the sheet.

Meanwhile, the resulting polyester dispersed in the resin dispersion of the present invention preferably has a self-dispersibility, and the resin dispersion preferably contains no surfactant from the viewpoint of improving a hydrophobicity of the thermal transfer image-receiving sheet.

[Thermal Transfer Image-Receiving Sheet and Process for Producing the Same]

The thermal transfer image-receiving sheet of the present invention includes a substrate and a dye receptor layer formed on at least one surface of the substrate. The dye receptor layer contains the polyester of the present invention, and is preferably obtained by applying the resin dispersion of the present invention onto the substrate.

Dye Receptor Layer

The dye receptor layer preferably contains a releasing agent. As the releasing agent, there is preferably used, for example, a water-dispersible or water-soluble modified silicone oil and/or a colloid solution of fine particles of a silicic anhydride (e.g., colloidal silica), etc. The average particle size of the fine particles of the silicic anhydride dispersed in the colloid solution is preferably 100 nm or less from the viewpoint of a good dispersibility thereof in the thermal transfer image-receiving sheet. More preferably, there is used colloidal silica having an average particle size of 20 nm or less. The dye receptor layer may also contain, in addition to the above releasing agent, other releasing agents such as polyethylene and polypropylene. The content of the releasing agent in the dye receptor layer is preferably from 0.1 to 20 parts by weight and more preferably from 0.5 to 10 parts by weight on the basis of 100 parts by weight of the resins from the viewpoints of a good releasability of the resulting thermal transfer image-receiving sheet and a good dyeability thereof with dyes.

The dye receptor layer may be produced as follows. That is, a coating solution containing the polyester of the present invention and optionally the releasing agent, if required, is applied onto the substrate, for example, by a gravure printing method, a screen printing method, a reverse roll coating method using a gravure printing plate, etc., and then the obtained coating layer is dried.

The dye receptor layer may be provided thereon with a releasing layer containing the releasing agent from the viewpoint of further improving a releasability thereof from a thermal transfer sheet upon transfer of images. The releasing layer is preferably formed from various reactive silicones such as hydroxy-modified silicones, amino-modified silicones, carboxy-modified silicones and mercapto-modified silicones. These reactive silicones may be crosslinked using a crosslinking agent, if required.

The dye receptor layer of the present invention preferably contains a pigment or a filler such as titanium oxide, zinc oxide, kaolin clay, calcium carbonate and silica fine particles from the viewpoint of enhancing a whiteness of the dye receptor layer and a clarity of transferred images. The content of the pigment or filler in the dye receptor layer is from 0.1 to 20 parts by weight and preferably from 0.1 to 10 parts by weight on the basis of 100 parts by weight of the resins from the viewpoint of a good whiteness of the thermal transfer image-receiving sheet.

The dye receptor layer may further contain, if required, other additives such as, for example, a film-forming agent such as diethylene glycol monobutyl ether acetate and diethylene glycol diethyl ether, a crosslinking agent, a curing agent and a catalyst.

The thickness of the thus formed dye receptor layer is generally from 1 to 50 μm, and preferably from 3 to 15 μm from the viewpoints of a good image quality and a good productivity. In addition, the solid content in the coating layer after dried is preferably from 3 to 15 g per 1 $m^2$ of the obtained dye receptor layer.

The dye receptor layer may be produced from a coating solution obtained by dissolving the polyester of the present invention in an organic solvent, or a coating solution containing a resin dispersion obtained by dispersing the polyester of the present invention in an organic solvent or water. Among them, from the viewpoints of environmental suitability, etc., the resin dispersion of the present invention in which the polyester of the present invention is dispersed in water is preferably used. The details of the resin dispersion obtained by dispersing the polyester in an organic solvent or water are as described above.

When using the coating solution obtained by dissolving the polyester of the present invention in an organic solvent, examples of the organic solvent include ketone-based solvents such as acetone, methyl ethyl ketone, diethyl ketone, dipropyl ketone, methyl isobutyl ketone and methyl isopropyl ketone; hydrocarbon-based solvents such as toluene and xylene; and ether-based solvents such as tetrahydrofuran and dioxane. Among these organic solvents, from the viewpoints of a good dissolvability of the resin therein and a good volatilizability upon drying, preferred are methyl ethyl ketone (MEK) and toluene, and more preferred is a mixed solvent of methyl ethyl ketone and toluene.

As the method of producing the resin-dissolved solution by dissolving the polyester in the organic solvent, there may be used the method of mixing the polyester and the organic solvent with each other, and then stirring the obtained mixture at an ordinary temperature or under heating, more specifically, at a temperature of from 20 to 50° C. to dissolve the polyester in the organic solvent. The solid concentration of the resulting coating solution is preferably from 10 to 45% by weight and more preferably from 20 to 40% by weight from the viewpoints of a good workability and a good productivity.

Thermal Transfer Image-Receiving Sheet

The thermal transfer image-receiving sheet of the present invention includes a substrate, and the dye receptor layer formed on at least one surface of the substrate.

Examples of the substrate include synthetic papers (such as polyolefin-based papers and polystyrene-based papers), wood-free papers, art papers, coated papers, cast coated papers, wall papers, backing papers, synthetic resin- or emulsion-impregnated papers, synthetic rubber latex-impregnated papers, synthetic resin-internally added papers, paper boards, cellulose fiber papers, and films or sheets made of various resins such as polyolefins, polyvinyl chloride, polyethylene terephthalate, polystyrene, polymethacrylates and polycarbonates. Further, as the substrate, there may also be used white opaque films produced by shaping any of these resins with a white pigment or a filler into a film, or foamed sheets, as well as laminates composed of combination of these substrates.

The thickness of these substrates is generally, for example, from about 10 to about 300 μm. The substrates are preferably subjected to surface treatments such as primer treatment and corona discharge treatment from the viewpoint of enhancing an adhesion thereof to the dye receptor layer.

The transfer sheet used upon conducting a thermal transfer procedure using the above thermal transfer image-receiving sheet of the present invention is usually in the form of a sheet obtained by forming a dye layer containing a sublimable dye on a paper or a polyester film. In the present invention, there may be used any of conventionally known transfer sheets.

Examples of the sublimable dye suitably used for the thermal transfer image-receiving sheet of the present invention include yellow dyes such as pyridone-azo-based dyes, dicyano-styryl-based dyes, quinophthalone-based dyes and merocyanine-based dyes; magenta dyes such as benzene-azo-based dyes, pyrazolone-azomethine-based dyes, isothiazole-based dyes and pyrazolo-triazole-based dyes; cyan dyes such as anthraquinone-based dyes, cyano-methylene-based dyes, indophenol-based dyes and indonaphthol-based dyes.

As the method for applying a heat energy upon the thermal transfer, there may be used any of conventionally known methods, for example, the method of applying a heat energy of from about 5 to about 100 mJ/mm$^2$ by controlling a recording time using a recording apparatus such as a thermal printer.

Process for Producing Thermal Transfer Image-Receiving Sheet

One of the processes for producing the thermal transfer image-receiving sheet according to the present invention includes the steps of (1) producing the resin dispersion for thermal transfer image-receiving sheets by the process as defined above; and (2) applying the resin dispersion obtained in the step (1) onto at least one surface of the substrate to form the dye receptor layer thereon. Another process for producing the thermal transfer image-receiving sheet according to the present invention includes the steps of (1') producing the resin-dissolved solution by dissolving the polyester of the present invention in the organic solvent; and (2') applying the resin-dissolved solution obtained in the step (1') onto at least one surface of the substrate to form the dye receptor layer thereon.

The details of the resin dispersion produced in the step (1), the resin-dissolved solution produced in the step (1'), the substrate used in the step (2) and (2') and the dye receptor layer obtained in the step (2) and (2') are as described above.

In accordance with the present invention, there can be provided a polyester for thermal transfer image-receiving sheets which allows the resulting thermal transfer image-receiving sheet to satisfy all of a dyeability, a light resistance and a releasability at the same time; a resin dispersion containing the polyester; a process for producing the resin dispersion; a thermal transfer image-receiving sheet using the polyester; and a process for producing the thermal transfer image-receiving sheet.

The thermal transfer image-receiving sheet using the polyester of the present invention is capable of satisfying all of a dyeability, a light resistance and a releasability at the same time and, therefore, can be suitably used as a thermal transfer image-receiving sheet exhibiting an excellent image performance.

The present invention is described in more detail by referring to the following examples, etc. However, it should be noted that these examples are only illustrative and not intended to limit the invention thereto.

In the following examples, etc., various properties were measured and evaluated by the following methods.

[Acid Value of Resins]

The acid value of resins was measured according to JIS K0070. However, with respect to the solvent used upon the measurement, the mixed solvent of ethanol and ether was replaced with a mixed solvent containing acetone and toluene at a volume ratio of 1:1.

[Softening Point and Glass Transition Point of Resins]

(1) Softening Point:

Using a flow tester "CFT-500D" available from Shimadzu Corporation, 1 g of a sample was extruded through a nozzle having a die pore diameter of 1 mm and a length of 1 mm while heating at a temperature rise rate of 6° C./min and applying a load of 1.96 MPa thereto by a plunger. The softening point was determined as the temperature at which a half amount of the sample was flowed out, when plotting a downward movement of the plunger of the flow tester relative to the temperature.

(2) Glass Transition Point:

Using a differential scanning calorimeter ("Pyris 6DSC" available from Perkin Elmer, Inc.), a sample was heated to 200° C. and then cooled from 200° C. to 0° C. at a temperature drop rate of 10° C./min, and thereafter heated again at temperature rise rate of 10° C./min. The temperature at which an extension of a baseline below a maximum peak temperature observed in the endothermic curve was intersected with a tangential line having a maximum inclination of the curve in a region of from a rise-up portion of the peak to an apex of the peak was read as the glass transition point.

[Number-Average Molecular Weight of Resins]

The number-average molecular weight was calculated from the molecular weight distribution measured by gel permeation chromatography according to the following method.

(1) Preparation of Sample Solution

The resin was dissolved in tetrahydrofuran (THF) to prepare a solution having a concentration of 0.5 g/100 mL. The resultant solution was then filtered through a fluororesin filter ("FP-200" available from Sumitomo Electric Industries, Co., Ltd.) having a pore size of 2 μm to remove insoluble components therefrom, thereby preparing a sample solution.

(2) Measurement of Molecular Weight Distribution

Using the below-mentioned analyzer, THF was allowed to flow at a rate of 1 mL/min, and the column was stabilized in a thermostat at 40° C. One hundred microliters of the sample solution was injected into the column to measure a molecular weight distribution thereof The molecular weight of the sample was calculated on the basis of a calibration curve previously prepared. The calibration curve of the molecular weight was prepared by using several kinds of monodisperse polystyrenes (those polystyrenes having molecular weights of $2.63 \times 10^3$, $2.06 \times 10^4$ and $1.02 \times 10^5$ available from Tosoh Corp.; and those polystyrenes having molecular weights of $2.10 \times 10^3$, $7.00 \times 10^3$ and $5.04 \times 10^4$ available from GL Science Co., Ltd.) as standard samples.

Analyzer: CO-8010 (available from Tosoh Corp.)
Column: GMHLX+G3000HXL (available from Tosoh Corp.)

[Particle Size of Resin Particles]

The particle size of resin particles was measured using a laser diffraction particle size analyzer ("LA-920" available from HORIBA Ltd.). That is, a cell for the measurement was filled with distilled water, and a volume median particle size (D50) of the resin particles was measured at a concentration at which an absorbance thereof was within an adequate range.

[Solid Concentration of Resin Dispersion]

Using an infrared moisture meter ("FD-230" available from Kett Electronic Laboratory), 5 g of the dispersion was dried at 150° C., and the water content (%) thereof on a wet base was measured under a measuring mode 96 (monitoring time: 2.5 min; variation width: 0.05%). The solid concentration of each dispersion was calculated according to the following formula.

Solid Concentration (%)=100−$M$ wherein M is a water content (%) on a wet base represented by the following formula:

Water Content (%) on Wet Base=$[(W-W_0)/W]\times 100$ wherein W is a weight of the sample before measurement (initial weight of the sample); and $W_0$ is a weight of the sample after measurement (absolute dry weight of the sample).

PRODUCTION EXAMPLE 1

Production of Polyester (a)

A four-necked flask equipped with a nitrogen inlet tube, a dehydration tube, a stirrer and a thermocouple was charged with 4480 g of polyoxypropylene(2.2)-2,2-bis(4-hydroxyphenyl)propane, 1040 g of polyoxyethylene(2.0)-2,2-bis(4-hydroxyphenyl)propane, 1992 g of isophthalic acid and 25 g of tin (II) dioctylate. The contents of the flask were reacted with each other at 230° C. for 5 h in a nitrogen atmosphere, and further reacted under reduced pressure (8.3 kPa). Thereafter, 461 g of trimellitic anhydride was added at 210° C. to the obtained reaction product, and the resultant mixture was further reacted until the softening point as measured according to ASTM D36-86 reached 150° C., thereby obtaining a polyester (a). As a result, it was confirmed that the thus obtained polyester (a) had a softening point of 151° C., a glass transition point of 71° C., an acid value of 17 mgKOH/g and a number-average molecular weight of 5318.

PRODUCTION EXAMPLE 2

Production of Polyester (b)

A four-necked flask equipped with a nitrogen inlet tube, a dehydration tube, a stirrer and a thermocouple was charged with 4480 g of polyoxypropylene(2.2)-2,2-bis(4-hydroxyphenyl)propane, 1040 g of polyoxyethylene(2.0)-2,2-bis(4-hydroxyphenyl)propane, 1594 g of isophthalic acid and 25 g of tin (II) dioctylate. The contents of the flask were reacted with each other at 230° C. for 5 h in a nitrogen atmosphere, and further reacted under reduced pressure (8.3 kPa). Thereafter, 922 g of trimellitic anhydride was added at 210° C. to the obtained reaction product, and the resultant mixture was further reacted until the softening point as measured according to ASTM D36-86 reached 120° C., thereby obtaining a polyester (b). As a result, it was confirmed that the thus obtained polyester (b) had a softening point of 124° C., a glass transition point of 72° C., an acid value of 36 mgKOH/g and a number-average molecular weight of 3314.

PRODUCTION EXAMPLE 3

Production of Polyester (c)

A four-necked flask equipped with a nitrogen inlet tube, a dehydration tube, a stirrer and a thermocouple was charged with 2859 g of polyoxypropylene(2.2)-2,2-bis(4-hydroxyphenyl)propane, 1462 g of 1,4-cyclohexanedicarboxylic acid and 22 g of tin (II) dioctylate. The contents of the flask were reacted with each other at 200° C. under normal pressures for 8 h in a nitrogen atmosphere, and further reacted under reduced pressure (8.3 kPa). Thereafter, the resultant reaction mixture was further reacted until the softening point as measured according to ASTM D36-86 reached 90° C., thereby obtaining a polyester (c). As a result, it was confirmed that the thus obtained polyester (c) had a softening point of 88° C., a glass transition point of 51° C., an acid value of 6 mgKOH/g and a number-average molecular weight of 3559.

PRODUCTION EXAMPLE 4

Production of Polyester (d)

A four-necked flask equipped with a nitrogen inlet tube, a dehydration tube, a stirrer and a thermocouple was charged with 1768 g of polyoxypropylene(2.2)-2,2-bis(4-hydroxyphenyl)propane, 66 g of glycerol, 1169 g of 1,4-cyclohexanedicarboxylic acid and 15 g of tin (II) dioctylate. The contents of the flask were reacted with each other at 200° C. under normal pressures for 8 h in a nitrogen atmosphere, and further reacted under reduced pressure (8.3 kPa). Thereafter, the resultant reaction mixture was further reacted until the softening point as measured according to ASTM D36-86 reached 120° C., thereby obtaining a polyester (d). As a result, it was confirmed that the thus obtained polyester (d) had a softening point of 123° C., a glass transition point of 61° C., an acid value of 32 mgKOH/g and a number-average molecular weight of 4568.

PRODUCTION EXAMPLE 5

Production of Polyester (e)

A four-necked flask equipped with a nitrogen inlet tube, a dehydration tube, a stirrer and a thermocouple was charged with 3700 g of polyoxypropylene(2.2)-2,2-bis(4-hydroxyphenyl)propane, 1298 g of succinic acid and 15 g of tin (II) dioctylate. The contents of the flask were reacted with each other at 200° C. under normal pressures for 8 h in a nitrogen atmosphere, and further reacted under reduced pressure (8.3 kPa). Thereafter, the resultant reaction mixture was further reacted until the softening point as measured according to ASTM D36-86 reached 80° C., thereby obtaining a polyester (e). As a result, it was confirmed that the thus obtained polyester (e) had a softening point of 77° C., a glass transition point of 38° C., an acid value of 15 mgKOH/g and a number-average molecular weight of 5016.

The compositions and properties of the respective polyesters (a) to (e) obtained above are shown in Table 1.

TABLE 1

| | Production Examples | | | | |
|---|---|---|---|---|---|
| | 1 | 2 | 3 | 4 | 5 |
| Polyester A | | | (c) | (d) | (e) |
| Polyester B | (a) | (b) | | | |
| Raw monomers | | | | | |
| Alcohol component | | | | | |
| BPA-PO*¹ | 4480 g (80) | 4480 g (80) | 2859 g (100) | 1768 g (83.5) | 3700 g (100) |
| BPA-EO*² | 1040 g (20) | 1040 g (20) | | | |
| Glycerol | | | | 66 g (11) | |
| Carboxylic acid component | | | | | |
| Isophthalic acid | 1992 g (75) | 1594 g (60) | | | |
| Succinic acid | | | | | 1298 g (104) |
| 1,4-Cyclohexanedicarboxylic acid | | | | 1462 g (104) | 1169 g (104) |
| Trimellitic anhydride | 461 g (15) | 922 g (30) | | | |
| Tin (II) dioctylate | 25 g | 25 g | 22 g | 15 g | 15 g |
| Softening point (° C.) | 151 | 124 | 88 | 123 | 77 |
| Glass transition temperature (° C.) | 71 | 72 | 51 | 61 | 38 |
| Acid value (mg KOH/g) | 17 | 36 | 6 | 32 | 15 |
| Number-average molecular weight | 5318 | 3314 | 3559 | 4568 | 5016 |

Note
*: Numerals in parentheses indicate molar ratios on the basis of 100 mol as a total amount of the alcohol components; however, the numeral for glycerol indicates 1.5 times the actual molar ratio;
*¹Polyoxypropylene (2.2)-2,2-bis(4-hydroxyphenyl)propane;
*²Polyoxyethylene (2.0)-2,2-bis(4-hydroxyphenyl)propane

EXAMPLES 1 TO 6 AND COMPARATIVE EXAMPLES 1 AND 2

Resin Dispersions A to H

A four-necked flask equipped with a nitrogen inlet tube, a reflux condenser, a stirrer and a thermocouple was charged with the respective polyesters (a) to (e) at proportions shown in Table 2, and the polyesters were dissolved in methyl ethyl ketone at 25° C. Next, a 25% ammonia aqueous solution was added to the obtained solution, and further deionized water was added thereto under stirring, and then methyl ethyl ketone was distilled off from the obtained reaction solution at 50° C. under reduced pressure, thereby obtaining respective resin dispersions A to H. The compositions of the thus obtained respective resin dispersions A to H, the volume-median particle size of the polyester particles, and the solid content and pH of the dispersions are shown in Table 2.

TABLE 2

| | | Examples | | | |
|---|---|---|---|---|---|
| | Polyester | 1 | 2 | 3 | 4 |
| Resin dispersion | | A | B | C | D |
| Polyester (a) | Polyester B | 90 g | 150 g | 210 g | |
| Polyester (b) | Polyester B | | | | 210 g |
| Polyester (c) | Polyester A | 210 g | 150 g | 90 g | 90 g |
| Polyester (d) | Polyester A | | | | |
| Polyester (e) | Polyester A | | | | |
| Methyl ethyl ketone | | 540 g | 540 g | 540 g | 540 g |
| 25% Ammonia aqueous solution | | 3.4 g | 4.2 g | 4.0 g | 5.7 g |
| Deionized water | | 710 g | 710 g | 710 g | 710 g |
| Volume-median particle size of resin particles (nm) | | 325 | 163 | 139 | 166 |
| Solid content (wt %) | | 37.1 | 33.9 | 35.6 | 37.0 |
| pH | | 7.4 | 7.8 | 7.5 | 6.6 |

| | | Examples | | Comparative Examples | |
|---|---|---|---|---|---|
| | Polyester | 5 | 6 | 1 | 2 |
| Resin dispersion | | E | F | G | H |
| Polyester (a) | Polyester B | 150 g | 150 g | 300 g | |
| Polyester (b) | Polyester B | | | | |
| Polyester (c) | Polyester A | | | | |
| Polyester (d) | Polyester A | 150 g | | | 300 g |
| Polyester (e) | Polyester A | | 150 g | | |
| Methyl ethyl ketone | | 540 g | 540 g | 540 g | 540 g |
| 25% Ammonia aqueous solution | | 7.1 g | 5.1 g | 3.7 g | 7.0 g |
| Deionized water | | 710 g | 710 g | 710 g | 710 g |
| Volume-median particle size of resin particles (nm) | | 156 | 234 | 137 | 265 |
| Solid content (wt %) | | 34.0 | 44.4 | 37.4 | 36.1 |
| pH | | 7.7 | 6.9 | 7.3 | 7.5 |

EXAMPLES 7 TO 12 AND COMPARATIVE EXAMPLES 3 AND 4

Resin Particle Dispersions I to P

A four-necked flask equipped with a nitrogen inlet tube, a reflux condenser, a stirrer and a thermocouple was charged with the respective resin dispersions A to H and a water-soluble oxazoline-containing polymer ("EPOCROSS WS-500" available from Nippon shokubai Co., Ltd.; weight-average molecular weight: 70,000; number-average molecular weight: 20,000) at proportions shown in Table 3, and the contents of the flask were reacted with each other under stirring at 95° C. for 4 h, thereby obtaining respective resin particle dispersions I to P. The compositions of the thus obtained respective resin particle dispersions I to P, the volume-median particle size of the particles dispersed in the respective dispersions, and the solid content and pH of the respective dispersions are shown in Table 3.

TABLE 3

| | Examples | | | |
|---|---|---|---|---|
| | 7 | 8 | 9 | 10 |
| Resin particle dispersion | I | J | K | L |
| Resin dispersion A (g) | 700 | | | |
| Resin dispersion B (g) | | 700 | | |
| Resin dispersion C (g) | | | 700 | |
| Resin dispersion D (g) | | | | 790 |
| Resin dispersion E (g) | | | | |

TABLE 3-continued

| | | | | |
|---|---|---|---|---|
| Resin dispersion F (g) | | | | |
| Resin dispersion G (g) | | | | |
| Resin dispersion H (g) | | | | |
| Oxazoline-containing polymer* (g) | 38.5 | 43.0 | 53.3 | 120 |
| Volume-median particle size (nm) | 293 | 170 | 138 | 170 |
| Solid content (wt %) | 35.6 | 33.9 | 34.8 | 36.0 |
| pH | 8.9 | 9.0 | 8.8 | 8.5 |

| | Examples | | Comparative Examples | |
|---|---|---|---|---|
| | 11 | 12 | 3 | 4 |
| Resin particle dispersion | M | N | O | P |
| Resin dispersion A (g) | | | | |
| Resin dispersion B (g) | | | | |
| Resin dispersion C (g) | | | | |
| Resin dispersion D (g) | | | | |
| Resin dispersion E (g) | 863 | | | |
| Resin dispersion F (g) | | 700 | | |
| Resin dispersion G (g) | | | 700 | |
| Resin dispersion H (g) | | | | 700 |
| Oxazoline-containing polymer* (g) | 112 | 68.5 | 69.0 | 126 |
| Volume-median particle size (nm) | 166 | 244 | 131 | 39500 |
| Solid content (wt %) | 33.8 | 35.2 | 35.9 | 35.0 |
| pH | 8.8 | 8.4 | 8.7 | 8.3 |

Note
*EPOCROSS WS-700

EXAMPLES 13 TO 20 AND COMPARATIVE EXAMPLES 5 TO 8

Production of Thermal Transfer Image-Receiving Sheet

The respective components were mixed with each other at 25° C. at the proportions as shown in Table 4 to prepare coating solutions Q to Z, AA and AB. The thus prepared coating solutions were respectively applied onto a synthetic paper "YUPO FGS-250" (thickness: 250 μm; basis weight: 200 g/m$^3$) using a wire bar such that a coating amount thereof after dried was 5.0 g/m$^2$, and then dried at 50° C. for 2 min (however, in Examples 19 and 20 and Comparative Examples 7 and 8, the coating solutions were dried at 50° C. for 15 h), thereby obtaining thermal transfer image-receiving sheets. Next, a gradation pattern of respective colors including black (K), yellow (Y), magenta (M), cyan (C), green (G), red (R) and blue (B) was printed onto the thus obtained thermal transfer image-receiving sheet using a commercially available sublimation-type printer ("SELPHY" available from Canon Corp.). The thus printed gradation patterns were respectively evaluated for a dyeabllity (printing sensitivity and maximum density) and a light resistance thereof by the following methods. In addition, a black solid image having a size of 5×5 cm was printed to evaluate a releasability of the thermal transfer image-receiving sheet from an ink ribbon (heat fusibility therebetween) upon printing. The respective results of the measurements are shown in Table 4.

Evaluation Methods
(Dyeability: Printing Sensitivity)
The density of transferred color obtained in a low-density printed black image (9th Gradation) was measured using a Gretag densitometer.
(Dyeability: Maximum Density)
The density of transferred color obtained in a high-density printed black image (18th Gradation) was measured using a Gretag densitometer.

(Releasability: Heat Fusibility)
The heat fusibility between the ink ribbon and the thermal transfer image-receiving sheet upon printing a black solid image was determined from a sound generated when the ink ribbon was peeled from the thermal transfer image-receiving sheet, according to the following ratings.
A: Peelable without any strange sound.
B: Peelable with slight strange sound.
C: Hardly peelable owing to heat fusion.
(Light Resistance)
The light resistance test was carried out using a xenon weather meter under the following conditions.
Illumination tester: "SX75" available from Suga Test Instruments Co., Ltd.
Light source: Xenon lamp
Filter: Inside: Quartz filter; Outside: #275
Panel temperature: 50° C.
Humidity inside of vessel: 35 to 50% RH
Illumination intensity: 50 (W/m$^2$) as the value measured at a wavelength of 300 to 400 (nm)
Cumulative illumination intensity: 10000 (kJ/m$^2$) as the cumulative value integrated over a wavelength range of 300 to 400 (nm)
Change in hue:
An optical reflection density of each of black (K), yellow (Y), magenta (M), cyan (C), green (G), red (R) and blue (B) images on the printed gradation pattern was measured using an optical densitometer (measured by a Gretag densitometer). At the step where the optical reflection density before irradiated with light was near 1.0, the L*, a* and b* values before and after irradiated with light were measured using a color/color difference meter (measured by a Gretag densitometer), and a change in hue was calculated from the measured values according to the following formula to evaluate a light resistance of the printed images of black (K) and the respective chromatic colors. Meanwhile, the "black (K)+chromatic colors" appearing in Table 4 means a sum of amounts of change in hue of the black (K), yellow (Y), magenta (M), cyan (C), green (G), red (R) and blue (B) colors.

Change in hue=$((a^*_1-a^*_2)^2+(b^*_1-b^*_2)^2)^{1/2}$ wherein $L^*_1$, $a^*_1$ and $b^*_1$ respectively represent L*, a* and b* values before irradiated with light; and $L^*_2$, a*2 and $b^*_2$ respectively represent L*, a* and b* values after irradiated with light.
(Image Quality (Smoothness of Surface of Printed Paper))
The quality of the surface of the printed paper after coated was observed by naked eyes to examine whether any irregularities were present on the surface thereof, and evaluated according to the following ratings.
A: Very smooth surface condition.
B: Small number of irregularities were recognized on the surface, but no problems occurred when practically used as a photograph.
C: Aggregates were recognized on the surface, and significant problems occurred when practically used as a photograph.

TABLE 4

| | Examples | | | |
|---|---|---|---|---|
| | 13 | 14 | 15 | 16 |
| Coating solution | Q | R | S | T |
| Formulation of coating solution | | | | |
| Resin  Polyester (a) (g) | | | | |
|   Polyester (c) (g) | | | | |

TABLE 4-continued

| | | | | |
|---|---|---|---|---|
| Resin dispersion for thermal transfer image-receiving sheets (solid content: 30 wt %) | | | | |
| Resin dispersion I (g) | 10 | | | |
| Resin dispersion J (g) | | 10 | | |
| Resin dispersion K (g) | | | 10 | |
| Resin dispersion L (g) | | | | 10 |
| Resin dispersion M (g) | | | | |
| Resin dispersion N (g) | | | | |
| Resin dispersion O (g) | | | | |
| Resin dispersion P (g) | | | | |
| Film-forming agent | | | | |
| Mixed solution of toluene/methyl ethyl ketone (50/50) (g) | | | | |
| Diethylene glycol diethyl ether (g) | 0.48 | 0.48 | 0.48 | 0.48 |
| Releasing agent | | | | |
| KF615A*1 (g) | 0.15 | 0.15 | 0.15 | 0.15 |
| Glass transition point of solid component*2 (° C.) | 50 | 52 | 56 | 51 |
| Softening point of solid component*2 (° C.) | 128 | 165 | 200 | 222 |
| Evaluation of thermal transfer image-receiving sheet | | | | |
| Image quality (smoothness of surface of printed paper) | A | A | A | A |
| Dyeability: Printing sensitivity | 0.61 | 0.57 | 0.54 | 0.59 |
| Dyeability/Releasability: Maximum density | 1.75 | 1.64 | 1.63 | 1.70 |
| Releasability: Heat fusion | A | A | A | A |
| Light resistance: (black) | 3.1 | 3.8 | 7.6 | 11.1 |
| Light resistance: (black + chromatic colors) | 18.5 | 25.7 | 37.5 | 53.5 |

| | Examples | | | |
|---|---|---|---|---|
| | 17 | 18 | 19 | 20 |
| Coating solution | U | V | W | X |
| Formulation of coating solution | | | | |
| Resin Polyester (a) (g) | | | 0.6 | 1 |
| Polyester (c) (g) | | | 1.4 | 1 |
| Resin dispersion for thermal transfer image-receiving sheets (solid content: 30 wt %) | | | | |
| Resin dispersion I (g) | | | | |
| Resin dispersion J (g) | | | | |
| Resin dispersion K (g) | | | | |
| Resin dispersion L (g) | | | | |
| Resin dispersion M (g) | 10 | | | |
| Resin dispersion N (g) | | 10 | | |
| Resin dispersion O (g) | | | | |
| Resin dispersion P (g) | | | | |
| Film-forming agent | | | | |
| Mixed solution of toluene/methyl ethyl ketone (50/50) (g) | | | 8 | 8 |
| Diethylene glycol diethyl ether (g) | 0.48 | 0.48 | | |
| Releasing agent | | | | |
| KF615A*1 (g) | 0.15 | 0.15 | 0.1 | 0.1 |
| Glass transition point of solid component*2 (° C.) | 58 | 58 | 50 | 52 |
| Softening point of solid component*2 (° C.) | 254 | 152 | 101 | 103 |
| Evaluation of thermal transfer image-receiving sheet | | | | |
| Image quality (smoothness of surface of printed paper) | A | A | A | A |
| Dyeability: Printing sensitivity | 0.54 | 0.45 | 0.59 | 0.54 |
| Dyeability/Releasability: Maximum density | 1.59 | 1.40 | 1.65 | 1.64 |
| Releasability: Heat fusion | A | B | A | A |
| Light resistance: (black) | 8.0 | 4.4 | 6.1 | 9.9 |
| Light resistance: (black + chromatic colors) | 40.6 | 31.7 | 33.2 | 52.1 |

| | Comparative Examples | | | |
|---|---|---|---|---|
| | 5 | 6 | 7 | 8 |
| Coating solution | Y | Z | AA | AB |
| Formulation of coating solution | | | | |
| Resin Polyester (a) (g) | | | 2 | |
| Polyester (c) (g) | | | | 2 |
| Resin dispersion for thermal transfer image-receiving sheets (solid content: 30 wt %) | | | | |
| Resin dispersion I (g) | | | | |
| Resin dispersion J (g) | | | | |
| Resin dispersion K (g) | | | | |
| Resin dispersion L (g) | | | | |
| Resin dispersion M (g) | | | | |
| Resin dispersion N (g) | | | | |
| Resin dispersion O (g) | 10 | | | |
| Resin dispersion P (g) | | 10 | | |
| Film-forming agent | | | | |
| Mixed solution of toluene/methyl ethyl ketone (50/50) (g) | | | 8 | 8 |
| Diethylene glycol diethyl ether (g) | 0.48 | 0.48 | | |
| Releasing agent | | | | |
| KF615A*1 (g) | 0.15 | 0.15 | 0.1 | 0.1 |
| Glass transition point of solid component*2 (° C.) | 68 | 60 | 71 | 51 |
| Softening point of solid component*2 (° C.) | 245 | 182 | 151 | 88 |
| Evaluation of thermal transfer image-receiving sheet | | | | |
| Image quality (smoothness of surface of printed paper) | A | C | A | A |
| Dyeability: Printing sensitivity | 0.54 | 0.53 | 0.61 | 0.59 |
| Dyeability/Releasability: Maximum density | 1.63 | 1.60 | 1.65 | 1.38 |
| Releasability: Heat fusion | A | A | A | C |
| Light resistance: (black) | 14.3 | 6.2 | 20.9 | 1.1 |
| Light resistance: (black + chromatic colors) | 67.9 | 30.5 | 92.3 | 11.0 |

Note

*1KF615A (Polyether-modified silicone available from Shin-Etsu Chemical Industry Co., Ltd.)

*2Solid content of aqueous dispersion containing the polyester-containing resins and the oxazoline compound

The invention claimed is:

1. A process for producing a resin dispersion for a thermal transfer image-receiving sheet, comprising:

(a) dispersing resin particles in an aqueous medium, to obtain a resin dispersion; and (b) adding an oxazoline group-containing compound to said resin dispersion, wherein said resin particles comprise a polyester which comprises:

(A) a polyester A produced from an alcohol component containing 50 mol% or more of an alkyleneoxide adduct of 2,2-bis(4-hydroxyphenyl)propane represented by formula (I):

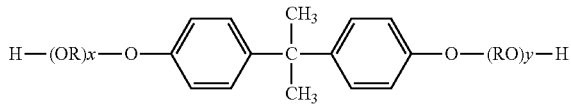

wherein RO is an oxyalkylene group; R is an ethylene group or a propylene group; and x and y each represent a molar number of addition of alkylene oxides, and are respectively a positive number with the proviso that a sum of x and y is from 2 to 7 on the average, and an acid component containing 80 mol% or more of an aliphatic carboxylic acid and/or an alicyclic carboxylic acid as a total amount thereof; and (B) a polyester B produced from an alcohol component containing 80 mol% or more of said alkyleneoxide adduct of 2,2-bis(4-hydroxyphenyl)propane represented by formula (I), and an acid component containing 10 to 35 mol% of a trivalent or higher valent aromatic polycarboxylic acid.

2. A process for producing a thermal transfer image-receiving sheet, comprising applying a resin dispersion produced by a process as defined in claims 1 onto at least one surface of a substrate to form a dye receptor layer thereon.

3. A process according to claim 1, wherein a weight ratio of said polyester A to said polyester B is from 20/80 to 80/20.

4. A process according to claim 1, wherein a weight ratio of said polyester A to said polyester B is from 50/50 to 80/20.

5. A process according to claim 1, wherein a difference between a softening point of said polyester A and a softening point of said polyester B is not less than 10° C.

6. A process according to claim 1, wherein a difference between a softening point of said polyester A and a softening point of said polyester B is not less than 30° C.

7. A process according to claim 1, wherein a difference between a softening point of said polyester A and a softening point of said polyester B is not more than 100° C.

8. A process according to claim 1, wherein a difference between a softening point of said polyester A and a softening point of said polyester B is not more than 90° C.

9. A process according to claim 1, wherein said polyester has a softening point of from 75 to 160° C.

10. A process according to claim 1, wherein said polyester has a softening point of from 80 to 155° C.

11. A process according to claim 1, wherein said polyester has a glass transition point of from 35 to 80° C.

12. A process according to claim 1, wherein said polyester has an acid value of from 1 to 40 mg KOH/g.

13. A process according to claim 1, wherein said polyester has an acid value of from 5 to 36 mg KOH/g.

14. A process according to claim 1, wherein a content ratio of an ethyleneoxide adduct to a propyleneoxide adduct in said alkyleneoxide adduct of 2,2-bis(4-hydroxyphenyl)propane represented by formula (I) is from 50/50 to 0/100 in terms of a molar ratio therebetween.

15. A process according to claim 1, wherein a content ratio of an ethyleneoxide adduct to a propyleneoxide adduct in said alkyleneoxide adduct of 2,2-bis(4-hydroxyphenyl)propane represented by formula (I) is from 40/60 to 0/100 in terms of a molar ratio therebetween.

16. A process according to claim 1, wherein a content ratio of an ethyleneoxide adduct to a propyleneoxide adduct in said alkyleneoxide adduct of 2,2-bis(4-hydroxyphenyl)propane represented by formula (I) is from 30/70 to 0/100 in terms of a molar ratio therebetween.

17. A process according to claim 1, wherein said oxazoline group-containing compound is at least one member selected from the group consisting of 2,2-(1,3-phenylene)-bis(2-oxazoline), 2,2-(1,4-phenylene)-bis(2-oxazoline), and an oxazoline group-containing polymer.

18. A process according to claim 1, wherein said oxazoline group-containing compound is an oxazoline group-containing polymer having a molecular weight of 500 to 2,000,000.

19. A process according to claim 1, wherein said oxazoline group-containing compound is added to said dispersion in an amount of from 0.1 to 30 parts by weight in terms of solid content on the basis of 100 parts by weight of the resins containing said polyester.

20. A process according to claim 1, wherein said oxazoline group-containing compound is added to said dispersion in an amount of from 1 to 20 parts by weight in terms of solid content on the basis of 100 parts by weight of the resins containing said polyester.

* * * * *